Aug. 30, 1949. J. FLECK 2,480,458
BROILING APPARATUS
Filed April 21, 1947 3 Sheets-Sheet 1

INVENTOR
Joseph Fleck
BY
ATTORNEYS

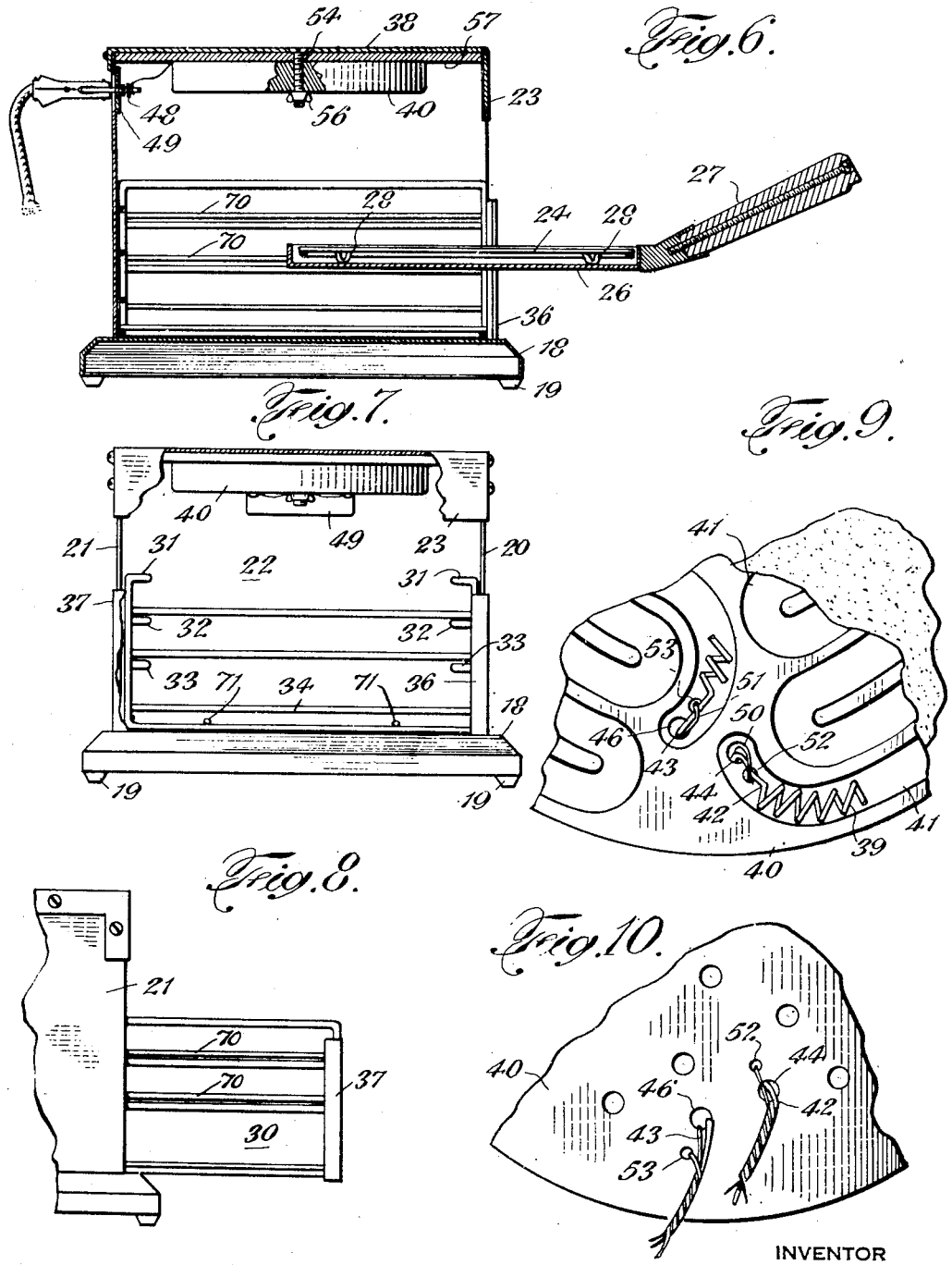

Aug. 30, 1949. J. FLECK 2,480,458
BROILING APPARATUS
Filed April 21, 1947 3 Sheets-Sheet 3

INVENTOR
Joseph Fleck
BY
Emery, Varney, Whittemore &Dix
ATTORNEYS

Patented Aug. 30, 1949

2,480,458

UNITED STATES PATENT OFFICE 2,480,458

BROILING APPARATUS

Joseph Fleck, Asbury Park, N. J., assignor to Fleck Broiler Company, Inc., New York, N. Y., a corporation of New York Application April 21, 1947, Serial No. 742,866

6 Claims. (Cl. 99—391)

This invention relates to an improved heating device that is readily available for heating or cooking, in a novel manner, foods or products of medium size or of size which will readily fit into the device.

One of the features of the invention is to provide a heating device in the form of a simple construction of cabinet that will quickly heat any product inserted therein, and when employed for foods it will cook them quickly and effectively. This invention has many advantages in cooking foods so as to maintain substantially all of its food values therein.

In addition, the invention relates to a novel type of broiling cabinet which is transportable and which, in the family size, holds food that may be cooked on the table, if desired, and to accomplish the cooking in a much shorter time than with an ordinary broiler.

Another feature of this improved invention is the provision of a novel heating device that will allow the food to be subjected to a relatively high heat for a short time and then to move the food to a position where it is not subject to such high heat but to a correct temperature for further cooking or broiling the particular food so as to maintain therein substantially all of the various food values.

A still further feature of the invention is the provision of an improved broiler cabinet or cooking device which will quickly cook or broil the food, not under pressure, but at a proper relation to the heat applied, and be movable from the heat to various distances, during the cooking to maintain the food value within the food.

The improved device herein is so constructed it may be used for subjecting products other than food to heat of varying degrees for the purposes for which the products are being subjected.

When using this novel heating device for cooking foods, it has been found that it is especially advantageous in broiling foods and particularly in being able to sear, broil, crust, toast or tenderize the food, and to accomplish these results in a short time, which from experience, is shown to be about one-quarter of the time required in the heaters or broilers heretofore being sold on the open market. This rapid cooking assists in keeping the flavors, juices, vitamins, and minerals within the food and allows cooking so as to produce a food with the outside fairly well cooked and the interior still in somewhat rare state, or to produce a well cooked food all the way through.

The improved broiler cabinet has several other advantages. One is that no preheating is necessary and that there is no smoking or odors produced during the cooking. The food is not burned and there is no splattering. The food is cooked in a manner that allows the food to be seen at all times.

It is possible to sear the food quickly and effectively, thereby maintaining the food values within the food, and then to increase the distance between the heating unit and the food so that a thorough or less thorough cooking may be obtained, as desired.

This improved broiler provides for the application of a high concentrated heat and operates in such a manner that fresh oxygen is continuously brought in over the top of the food being cooked by pulling fresh air in, and permits the oxygen to be burned to provide heat in addition to the heat produced by the heating unit. Also, the heated air and gases are being continuously moved up from the bottom of the food around the sides of the food to the top of the broiler and thereby heat the food.

Another feature of the invention is providing an improved means for supporting the food or product or material to be subjected to the heat so that the amount of heat may be varied without the withdrawal of the food from the broiler or cabinet, thereby maintaining the food or product under the influence of the heat within the broiler and not allowing it to be subjected to the outside atmosphere until after the broiling or cooking has been accomplished.

There are several mechanical features in this improved device which are novel and which provide for more efficient use of the device and which seldom require repairs or checking. Among these features are the joining of the ends of the electrical heating unit to the outside connections or terminals of the broiler or device, thereby requiring little or no repair at this point; and providing means to prevent a material amount of the heat from moving outside of the device as the cooking is quickly done; and providing improved construction for holding the food supporting element so that currents of heat will flow up around the sides and to the top of the food and its support, and thereby use much of the oxygen of the incoming air in obtaining rapid cooking or heating, as the case may be.

Another feature of the invention is the use of an improved electrical resistance wire for heating and obtaining various types of heat rays.

The improved construction of the broiler cabinet provides for relatively high heat concentration which in the preferred form approximates about 40 watts per square inch of heating area of the unit and provides a temperature approximating 1800° F. at the heat source.

The theory of operation of the heating device to produce excellently cooked food in such a short time will be described below as the present best understood theory to give the results, but it is to be understood that other theories for obtaining these improved heating or cooking results may be presented.

When considering foods the broilers which have been heretofore used for many years and in connection with a meat, require that the broiler be preheated, and that the meat be cooked for at least ten to twelve minutes on one side, and then approximately the same length of time on the other side. With this total length of time usually the meat toughens and dries and loses the juices and extracts which usually are considered to carry the minerals and vitamins.

With the improved broiler herein, no preheating of the broiler cabinet is required and it has been found that the equivalent food will be well cooked by its subjection to the heating unit for approximately three minutes on one side and for approximately three minutes on the other side and the surfaces are sufficiently and quickly seared thereby preventing the loss of practically all the juices and extracts and maintaining the minerals and vitamins within the meat.

In the presentation of one theory of this successful operation of this improved broiler in which no preheating of the device is required and only a short cooking time is necessary, it will be understood that the broiler is open and permits new fresh air, with its full oxygen content present, to be brought in and up around the sides and over the top of the meat and have the burning oxygen join with the heat of the heating unit to create the desirable heat for cooking. Also, it is helpful if the particular type of electrical resistance unit for the heating is an alloy which gives infra red rays and such rays in the presence of fresh oxygen give the rapidity of broiling. It is understood that the infra red rays are composed of both long rays, which are invisible, and short rays, which are visible. These last rays assist in illuminating the cabinet. An ultra violet light is also produced by the heating element. It is understood that the longer infra red rays are the ones assisting materially in the cooking. The several heat rays are believed to strike the food and rebound into the flow of the air over the food.

It is also believed in the theory of the operation of this device to produce the quick satisfactory cooking of the food that the burning of the oxygen in the air which has been sucked into the broiler over the surface of the food and between the food and the heating unit causes a small partial vacuum which draws the air in and creates a flow of air over the food, thus providing a continuous current of fresh air across the exposed surface of the food and giving very efficient oxidation of the surface of the food. This flow of the air causes a spreading of the air currents so that in this construction of broiler they pass up the sides of the broiler to above the food.

It has been indicated by doctors and dieticians that broiled foods prepared in this manner apparently are much more appetizing and are easier to digest and are more nourishing and healthful when so cooked. The improved broiler cabinet herein produces foods cooked in a manner to give these values and results.

While the foregoing explanation has been made particularly in regard to cooking of foods, it will be understood that various products other than foods may be placed in the heating device and be subjected to high heat concentration for the entire heating, or may be subjected to high heat concentration for a relatively short period and then moved to a position from the heating element where a longer and less intense heat is received by the material being heated.

Other features and advantages of this improved broiler cabinet will be noted in a reading of the following detailed description and with reference to the accompanying drawings wherein:

Fig. 6 is a side elevational view of the cabinet with part of the wall broken away to show the heating element, the electrical connections, and one form of supporting means for holding the grid and pan in the cabinet;

Fig. 7 is an elevational view of the side of the cabinet which is open with the pan and grid removed, and the top broken away to show several parts of the cabinet;

Fig. 8 is a view showing a supporting rack partially withdrawn from one end of the cabinet;

Fig. 9 is a broken away view of the heating element and its support and showing an additional supporting means for the wires which lead from the holder to the terminals;

Fig. 10 is a partial view of the electrical resistance holding support showing the electrical resistance wires passing from the support or holder along with the additional wire supporting means;

Figure 1:
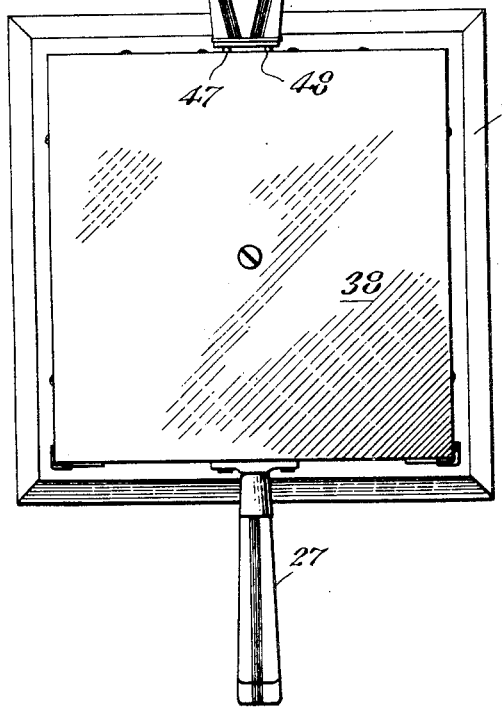
Fig. 1 is a top plan view of the broiler cabinet.
Figure 2:
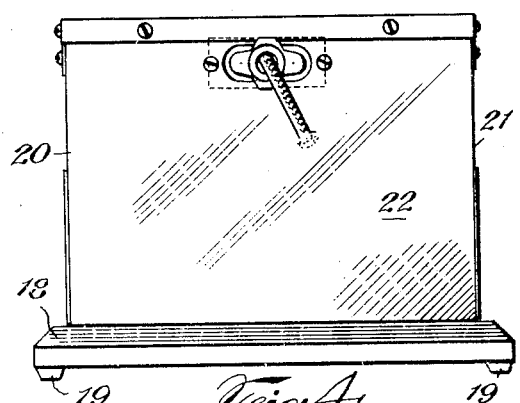
Fig. 2 is an elevational view of the rear of the cabinet showing the type of electrical connections to the terminals.
Figure 4:
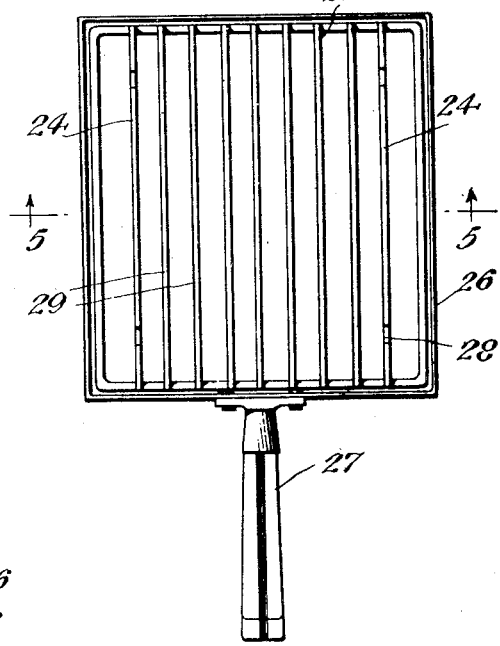
Fig. 4 is a top plan view of a grid for receiving foods or products to be heated and a pan for supporting the grid.
Figure 3:
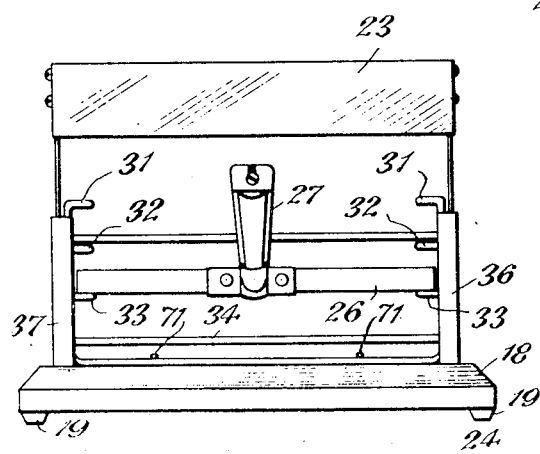
Fig. 3 is a front elevational view of the device showing that most of one of the sides is open to the atmosphere.
Figure 5:
Fig. 5 is a sectional view taken on lines 5—5 of Fig. 4.

Referring now to these drawings and particularly to Figs. 1, 2 and 3, it will be noted that the heating device, cabinet or broiler cabinet or body, may take any desired exterior or interior form and construction but the preferred construction of broiler cabinet which has been successful in operations is here shown as being substantially square and is provided with a base 18 and feet 19 of any material which does not scratch tables or other supports and has sides 20 and 21 and a back wall 22. The other side of the cabinet has a majority of its area open to the atmosphere. It does, however, have a cover 23 which is attached to the top and which extends down for a relatively short distance.

It is desired to provide a suitable means for supporting the food or product to be heated, and in this form a grid 24 supports the food and is mounted in a suitable pan 26 which in turn is provided with handle 27. The grid 24 is preferably provided with means for holding it from the bottom of pan 26 and in this instance, feet 28 are formed in at least two of the rounds 29 forming the longitudinal part of the grid. Other suitable means may be employed for supporting the food or for supporting the grid.

Any suitable means may be provided for positively holding the pan at various distances from the heating element in the broiler cabinet. In the drawings herein there are two such means, one is a rack 30 which has extensions 31, 32, 33 and slide supports or rods 71 held together by two front clips 36 which are provided with right angle extensions 37 that engage the side walls 20 and 21 of the cabinet in a manner that holds the rack in position in the cabinet, as particularly shown in Fig. 6. In this construction it is preferred that the engagements of extensions 37 with side walls 20 and 21 is frictional. It will be noted that this rack may be easily assembled in the cabinet or may be easily withdrawn but will not fall out. With this type of removable rack, it will be noted that cleaning of cabinet and rack is easily accomplished.

In the preferred structure herein, and for the purpose of preventing canting of the pan 26 when it is inserted into the rack, there are guide rods 70 of any suitable structure fastened to the supports 32 and 33 and to the frame so that when the pan is moved along slide supports 71 it will be properly guided into the cabinet. These guide rods engage the side edges of the pan so that it is easily inserted into the broiler without binding and along the selected support extensions as shown in Figs. 6 and 8 as being just above supports 32 and 33 and at the edges of the rack at the level of the slide rods 71.

The pan 26 and the grid 24 carried thereby may be placed on any of the rack extensions and thereby maintained in a definite position at a predetermined distance from the heating element. It, therefore, will be noted that the food to be cooked or products to be heated may be moved to different distances from the heating unit, which in this instance, is mounted in the top of the cabinet.

Figure 11:
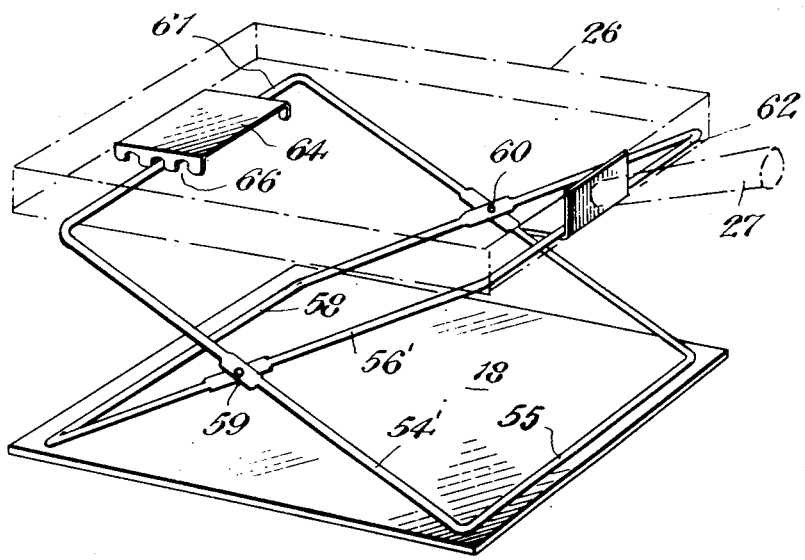
Fig. 11 is a perspective view showing another means for supporting the food to be cooked or product to be heated. This structure allows the food to be raised or lowered without being removed from the cabinet.
Figure 12:
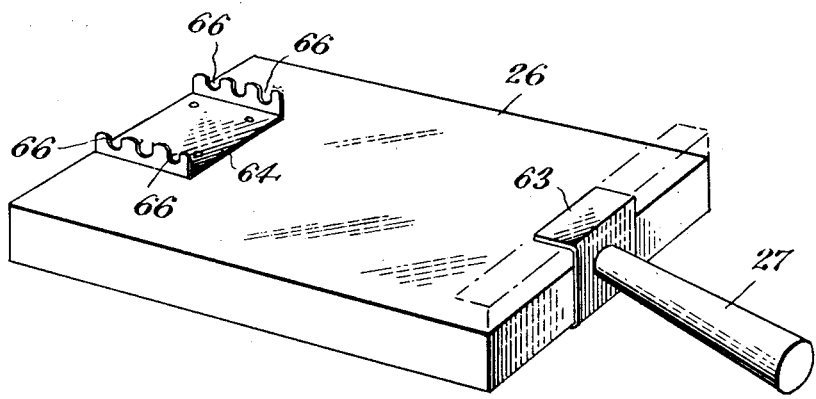
Fig. 12 is a perspective view of a portion of the support for holding the food or product and shows one structure for positively holding the support in any of the various positions.

Another means of positioning the food to be cooked or the products to be heated at different distances from the heating element, is shown in Figs. 11 and 12. This type of apparatus permits the food to be cooked, to be moved to different distances from the heating element while maintaining the food within the cabinet at all times. The details of this structure will be referred to later. The construction shown in Figs. 11 and 12 may be said to be the collapsible or expansion type of support that is easily positioned within the broiler cabinet. Also this type of structure may be referred to as the "floating" type of holder. In using this "floating" type of support, it will be noted that when one side of the meat has been cooked, the holder will be lowered and the meat turned over and then the holder raised back to the desired distance from the heating element, thus the meat may be entirely cooked without being removed from the cabinet.

Referring now to Figs. 6, 7, 9 and 10, the heating element will be described.

In obtaining the desired results of quick heating without the cabinet being preheated, it is preferred to have an electrical heating element positioned at most any place within the cabinet and to have the food to be cooked or the product to be heated, movable to and from the heating element. When desired, the reverse may be obtained, that is, to move the heating element to and from the food to be cooked or the product to be heated.

In the particular type of cabinet herein selected as the preferred type, it is desired that the heating element be affixed to the top wall 38 of the cabinet. The heating element preferably consists of an alloy resistance wire 39 mounted on a ceramic holder or support 40 or in channels 41 formed in the ceramic holder 40. The ends 42 and 43 of the resistance unit 39 pass through openings 44 and 46 formed in the ceramic holder 40 and are connected to terminals 47 and 48 which pass to the outside of the cabinet through a support 49 which is fastened to the back wall 22 of the cabinet.

In the improved construction of mounting the resistance wire 39 it is desired to eliminate the trouble of having the ends 42 and 43 of the resistance wire stop at the holes 44 and 46, and in this instance, these wires are carried through the ceramic holder 40 and lead to the terminals 47 and 48. It is desired that these ends 42 and 43 shall be supported from the points they leave the ceramic holder to the terminals 47 and 48 by any suitable additional supporting means. In this instance, the supporting means takes the form of a wire 50 and a wire 51 for the ends 42 and 43, respectively. It is preferred that wire 50 straddle the end 42 and pass through openings 44 and 52 in the ceramic holder and then be twisted with the wire 42 and all three wires lead to the terminal block. In like manner, wire 51 straddles the wire 43 and passes down through opening 46 and 53 and is twisted with the end 43 of the resistance wire and carries to the terminal block. In this manner the troubles heretofore encountered at the end of the resistance wires have been overcome, and a suitable support has been provided for the ends of the resistance element or wire 39 so that the ends 42 and 43 are not broken. Any other suitable means of supporting these terminal ends may be employed.

It has also been noted that one of the disadvantages heretofore encountered at the end of the resistance wires when they are not supported, has been the contraction and expansion due to the high heat and the following cooling. By reason of these alternate wide changes in temperature, the resistance wires have snapped at or near the terminals. By having the wires 50 and 51 twisted with the terminal wires 42 and 43, there is provided an additional supporting means and an additional means for conveying heat from the terminal wires, thereby preventing the terminal wires from having maximum expansion and contraction, as some of the heat at these points is dissipated through the additional wires 50 and 51. Thus, the three wires provide additional heat conductive surfaces for dissipating the heat from the resistance wire, thereby preventing the maximum expansions and contractions of the terminal wires which normally cause the breaking of these terminal wires.

While the showing herein illustrates a heating element mounted on the underside of the top of the cabinet, it will be understood that such a heating element may be mounted on any of the other walls of the cabinet and the grid holding the food or products to be heated, may be mounted in the cabinet as desired, or the grid may be of a structure that will allow it to be moved to or from the heating element. For instance, the heating element may be fastened to one of the side walls and the rack 30 turned vertically and the food thereby be positioned at various predetermined distances from the heating element.

Also, the heating element may be affixed to the walls in any fashion so that it may be removed or adjusted, as desired. In this instance, the ceramic holder 40 is held by the screw 54 which passes down through the top 38 and the thumb nut 56 screws it into position.

It is desired to keep the outside surface of the top of the cabinet from reaching too high a temperature and for such purpose a layer of heat resistance material 57 is provided. This may be material of an asbestos type alone or it may be a heat insulating material provided with an aluminum coating or any other heat reflecting material.

In providing the heating unit, it is desired that the resistance element 39 may be of an improved alloy which will give high heating concentration. Such an alloy has been found and it has been very satisfactory in providing a heat concentration of approximately 40 watts per square inch of area of heater plate and produces approximately 1800° F. of heat at this element itself, and this heat is directed toward the food or product to be heated. A 15-ampere wire and plug are satisfactory for approximately 1500 watt supply. With such a type of high heat in the presence of oxygen, a very high heat is obtained on the food to be cooked or the product to be heated. Thus, with this high concentration of high heat, the cooking may be rapid and the flavors, juices, vitamins and minerals are all kept in the food. Also it has been found that the food is clean and not burned and, therefore, is tasty. Also in the operation of this improved broiler cabinet, there is substantially no smoking or odors which reach into the room where the broiler is being used.

Referring now to Figs. 11 and 12 which show another means of positioning the food to be cooked or the products to be heated at different positions in respect to the heating element, a form of collapsible or expansion type of support is shown as being two rectangular members 54' and 56' having the feet portions 55 and 58 mounted on the base 18 inside of the cabinet. These two rectangular members are preferably pivoted together at points 59 and 60 and may be closed together so as to have the top edges 61 and 62 positioned at definite heights above the base 18 so as to move the pan 26 to different positions in respect to the heating element. This structure provides the "floating" shelf or holder.

It is desired to positively position the collapsible support at the various heights. This may be shown in any suitable manner as by having any type of rack member engaging the feet parts 55 and 58 of the support, but in the preferred instance herein, so as to have the device easily handled, it is desired to provide the pan 26 with a catch 63 which is mounted near the handle 27 and which receives the top edge 62 of the support 56.

A suitable means mounted on the pan 26 for engaging the top portion or edge 61 of support element 54' is provided in the form of a plate 64 with notches 66 that will engage the top rod or edge 61 of support element 54'. There may be as many notches 66 as desired in this plate 64. Any other type of attaching means on the bottom of the pan 26 for engagement with the top portion or edge 61 of support 54' may be employed.

In moving the pan 26 with the grid 24 mounted therein to different heights, it will be seen that grasping the handle 27 and lifting it up will cause the portion 61 of support 54 to free itself from notches 66 and any further pulling upward on handle 27 will allow the rod portion 61 to engage the nearest notch 66, or even to be placed against the outer edges of plate 64, thereby moving the material to be heated closer to the heating element. In reversing the movement so as to lower the material away from the heating element, handle 27 is again raised or tipped so as to free portion 61 from plate 64 and then is lowered, thereby collapsing the supporting elements 54' and 56' so that the engaging portion 61 will engage the last notch in the plate 64 thereby specifically maintaining the material to be heated positively at a definite distance from the heating element.

With this type of structure, it will readily be seen that the food to be cooked or the product to be heated may be maintained within the cabinet during the full cooking or heating period without being brought out into the atmosphere.

Also other suitable types of collapsible or expansion supports may be employed in positioning the food or products to be heated at different distances from the heating element.

From the foregoing description, it will be noted that the improved broiler cabinet is simple of construction and is portable and may be used in the dining room when food is being cooked, or may be placed on different shelves in laboratories, or the like, when the device is being employed to heat various products. Some of these products may be ones where it is desirable to bake enamel on them. Another example is heating ceramic materials so as to obtain a glossy surface.

When employing this broiler cabinet for cooking foods it will be noted that the food may be quickly cooked and have the advantage of maintaining the food values within the food.

It will be understood that various modifications and changes may be made in the preferred form of the invention herein, and such modifications and changes are to be understood as being part of this invention, as outlined in the following claims.

The invention claimed is:

1. In a heating device, a broiler cabinet having most of one side always open to the atmosphere, a heating element removably fastened to one of the interior surfaces of said cabinet, a heat insulating layer between the side of said cabinet and said heating element, a grid for receiving and holding the material to be heated, a pan for holding said grid and being provided with a handle extending to the outside of said cabinet for moving said material to be heated to any of several positions at different distances from said heating element, and a rack removably inserted in said broiler cabinet from the open side of said cabinet, said rack having upright clips for engaging the front edges of said broiler cabinet to tightly grip said cabinet and hold said rack in a predetermined position, said rack being open at its sides for allowing air to move therethrough said rack also having support extensions for receiving said pan at different levels, said pan having a width that allows air to rise around its sides and around parts of said rack to the top of said material on said grid.

2. In a heating device, a broiler cabinet having most of one side alwys open to the atmosphere, a heating element removably fastened to one of the interior surfaces of said cabinet, a heat insulating layer between the side of said cabinet and said heating element, a grid for receiving and holding the material to be heated, a pan for holding said grid and being provided with a handle extending to the outside of said cabinet for moving said material to be heated to any of several positions at different distances from said heating element, a rack removably inserted in said broiler cabinet from the open side of said cabinet said rack having upright clips for engaging the front edge of said broiler cabinet to tightly grip said cabinet and hold said rack in a predetermined position, said rack being open at its sides for allowing air to move therethrough and up around said pan and over the food, said rack having extensions for receiving said pan at different levels, the width of said rack and its extensions being of less width by approximately 10% than the width of the broiler cabinet.

3. In a broiler for foods, the combination of a broiler cabinet having at least half of one side thereof always open to the atmosphere, a heating unit mounted in said cabinet, a pan, a grid in said pan for receiving the food, a removable rack firmly positioned in said cabinet and held along the front upright edges thereof by clips that grip said upright edges in at least two different vertical points, said grips locating and holding said rack in a predetermined horizontal position in said broiler, said rack having a series of supports at different positions from said heating unit, said rack having a construction partially open to provide space between said rack and the walls of said cabinet, said pan constructed to be received in any one of said supports and leaving space at its sides to allow air to rise around it and through said rack thereby allowing a continuous movement of fresh air around the food during broiling.

4. In a broiler for foods, the combination of a broiler cabinet being open at the front thereof, a depending cover on the top edge of said front opening and extending part way down, a heating element removably fastened to the underside of the top of said cabinet and being hidden by said depending cover, a heat insulating layer between the top of said cabinet and said heating element, a removable rack firmly assembled in said cabinet and having one portion thereof engaging the base of said cabinet, said rack having at least three supports at different distances below said heating element, the topmost supports being a relatively short distance below the free end of said depending cover, said rack having an open work construction and being slightly spaced away from the sides of said cabinet, said rack having upright clips fastened to the front edges thereof for gripping the front edges of said cabinet and for limiting movement of said rack into said cabinet, a pan to be inserted in said cabinet and supported by one set of said supports of said rack, said pan having a handle extending outside of said cabinet for moving said pan to different sets of supports at different distances from said heating element to thereby properly have the food heated at first to provide a searing thereof to retain the juices, flavors, vitamins and minerals therein, a grid in said pan for receiving the food to be cooked, the width of said pan being a little less than the width of the rack thereby providing space at the sides of said pan to allow fresh air to arise around it and through said rack to have a continuous movement of fresh air up and around the food during broiling.

5. In combination with a broiler body, a rack for fitting into said body and for holding at different levels a pan with a long handle extending outside the broiler body for lifting said pan to said different levels and a grill with food thereon mounted in said pan, said rack having supports at different levels for receiving said pan and having guides positioned near said supports for guiding the sides of said pan as it is inserted, said rack being open at its sides for allowing air to move therethrough and up around said pan and over the food, and vertically extending clips fastened to the front edges of said rack for engaging the upright edges of the sides of said broiler body to firmly hold said rack in said body, said clips also acting to locate said rack horizontally in said broiler body.

6. In combination with a broiler body, a rack for fitting into said body and for holding at different levels a pan with a long handle extending outside the broiler body for lifting said pan to said different levels and a grill with food thereon mounted in said pan, said rack having supports at different levels for receiving said pan and having guides positioned near said supports for guiding the sides of said pan as it is inserted, said rack being open at its sides for allowing air to move therethrough and up around said pan and over the food, vertically extending clips fastened to the front edges of said rack for engaging the upright edges of the sides of said broiler body to firmly hold said rack in said body, said clips also acting to locate said rack horizontally in said broiler body, and slide supports near the bottom of said rack for receiving said pan and also acting to increase the strength of said rack.

JOSEPH FLECK.

REFERENCES CITED

The following references are of record in the file of this patent:

UNITED STATES PATENTS

| Number | Name | Date |
|---|---|---|
| 338,097 | Miles | Mar. 16, 1886 |
| 1,045,049 | Longfellow et al. | Nov. 19, 1912 |
| 1,599,560 | Ehrgott | Sept. 14, 1926 |
| 1,600,699 | Parke | Sept. 21, 1926 |
| 1,923,100 | Krag | Aug. 22, 1933 |
| 1,985,754 | Wiley | Dec. 25, 1934 |
| 1,989,275 | Hatch | Jan. 29, 1935 |
| 2,157,608 | Hoffstetter et al. | May 9, 1939 |
| 2,248,198 | Ratz | July 8, 1941 |
| 2,386,426 | Brannon | Oct. 9, 1945 |
| 2,456,988 | Pierson | Dec. 21, 1948 |

FOREIGN PATENTS

| Number | Country | Date |
|---|---|---|
| 105,219 | Germany | Nov. 26, 1898 |
| 254,191 | Great Britain | July 1, 1926 |